Figure 1:
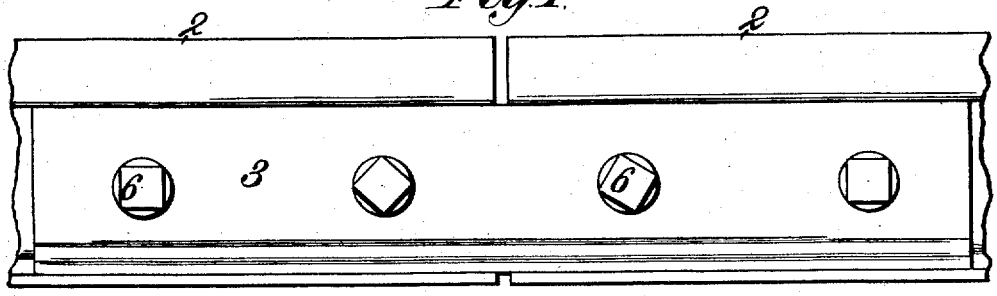

No. 12,497. REISSUED JUNE 26, 1906.

H. ALLEN.

RAIL JOINT.

APPLICATION FILED MAR. 24, 1906.

Witnesses.
Robert Everett.
James L. Morris, Jr.

Inventor.
Hosea Allen.
By James L. Morris
Atty.

ANDREW B. GRAHAM CO., PHOTO-LITHOGRAPHERS, WASHINGTON, D. C.

UNITED STATES PATENT OFFICE.

HOSEA ALLEN, OF OIL CITY, PENNSYLVANIA.

RAIL-JOINT.

No. 12,497. Specification of Reissued Letters Patent. Reissued June 26, 1906.

Original No. 802,794, dated October 24, 1905. Application for reissue filed March 24, 1906. Serial No. 307,926.

*To all whom it may concern:*

Be it known that I, HOSEA ALLEN, a citizen of the United States, residing at Oil City, county of Venango, and State of Pennsylvania, have invented certain new and useful Improvements in Rail-Joints; and I do hereby declare that the following is a full, clear, and exact description of the invention, which will enable others skilled in the art to which it appertains to make and use the same, reference being had to the accompanying drawings, and to the characters of reference marked thereon, which form part of this specification.

This invention relates to rail-joints.

My rail-joint, as is the case with those of the ordinary character, involves one or more fish-plates and bolts carrying nuts, the bolts, as usual, passing through registering perforations in the rails and fish-plates.

It is one of the primary objects of my present invention to hold these bolts against vibration and to secure a like function with respect to the nuts.

As is well known, bolts and nuts of the ordinary kind are subjected to material vibration owing to the jar incident to the travel of trains over the same. I provide a bolt of a novel construction wherein the head cannot be burst off. The bolts I prefer to make of iron to fit into fish-plates of like material, so as to add to the effectiveness of the joint. The latter is simple in construction and can be inexpensively made. As a matter of fact, the expense attending its manufacture is practically the same as that accompanying the production of a rail-joint of the common form.

In the drawings accompanying and forming a part of this specification I illustrate a certain arrangement of parts embracing my invention which I will set forth in detail in the following description; but I do not restrict myself to the precise disclosure thus made, for material and divers variations may be adopted within the scope of my invention involved in the claims succeeding said description.

Figure 2:
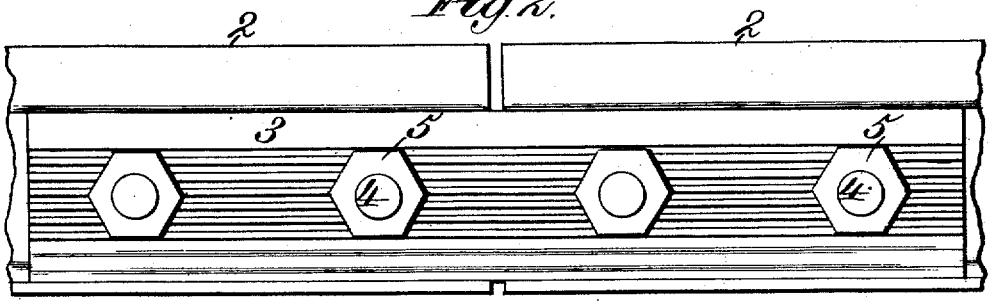
Figure 3:
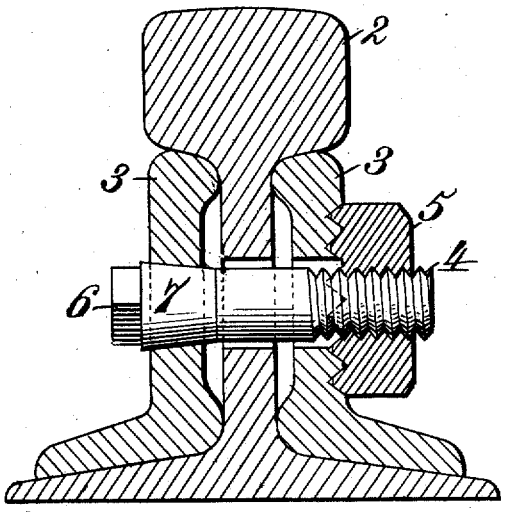
Figure 5:
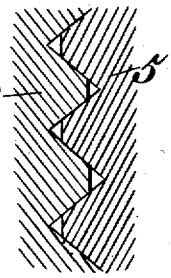
Figure 4:
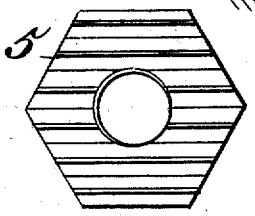

In the drawings, Figure 1 is an inside face view of a rail-joint including my invention. Fig. 2 is an outside face view of the same. Fig. 3 is a transverse sectional view, the section being taken through the perforations in the fish-plates and web of a rail, through which perforations a bolt extends, the latter being in elevation. Fig. 4 is an inside face view of one of the nuts shown in the preceding figure. Fig. 5 is a detail in section on an enlarged scale, showing a part of the corrugated fish-plate and a corrugated nut engaging the same.

Like characters refer to like parts throughout the different views.

In Figs. 1 and 2 of the drawings I have shown two abutting or substantially abutting rails, each being designated by 2 and being of the ordinary construction. Extending across the joint between the rails and fitting against the opposite faces of the webs of said rails I represent two fish-plates, each designated by 3. The fish-plates and webs of the rails have registering perforations to receive bolts, as 4, the nuts of the bolts being designated by 5. The nuts may either bear against the inner or outer fish-plates, as individual preference may dictate. They are represented as abutting against the outer fish-plate. The fish-plates and nuts have their opposing or engaging surfaces roughened to prevent vertical motion of the nuts when they are set up. This roughening may be secured in any desirable way—for example, by corrugating the said opposing surfaces. The outer fish-plate 3 is represented as having on its outer surface longitudinal corrugations which produce, as will be evident, alternate beads and channels, while the nuts have on their inner surfaces similar corrugations. When the nuts are set up solidly in place, the beaded or salient portions thereof will fit solidly and firmly into the channels or grooves in the fish-plate, so as to prevent motion of the nuts, and this relation is assured by forming the bolts in a novel manner. I do not limit myself to any particular shape of nut 5, as the same may be of any form. It is represented as being hexagonal. The end of each bolt 4 opposite that having the externally-threaded surface is provided with a head, as 6, serving as an operating-head and which is of such a shape as to receive an implement for driving the bolt home. The heads are shown as polygonal, a square shape being a satisfactory one, so that they can be set by an ordinary wrench used by trackmen.

It will be seen that the heads 6 are of less diameter than the greatest diameter of the respective tapered portions 7, whereby the advantages herein set forth for said bolts are assured. From this it will be evident that said heads can, should occasion require, enter the openings in the fish-plate in which the tapered portions 7 fit. It may be necessary for the heads to enter these openings or holes when the latter are worn away, as would be the case with old fish-plates, to which I can successively adapt my joint. Even with new plates it might be necessary for the heads 6 to enter said openings, so that in any case I can set the nuts 5 up and do this simply by turning the bolts through the agency of their heads without touching the nuts. By virtue of the construction of the heads they do not engage the fish-plate, so that there is no possibility of the heads being stripped off, as is a common occurrence in those bolts the heads of which abut against fish-plates. Between the head 6 and externally-threaded portion of each bolt there is a tapered surface 7, such surface, as will be evident, tapering inward from the head toward the threaded end of the bolt, so that when the bolt is turned it will be moved or advanced longitudinally, while at the same time the nut thereupon will be drawn inwardly solidly against the fish-plate and to such an extent that the nut and bolt will be prevented from vibration, even though the engaging surfaces of the nut and fish-plate be plain.

In operation the rails 2 will be laid in the customary manner, and the fish-plates 3 will be placed against the opposite faces of the webs of the two abutting rails to bring the perforations of the fish-plates in register with those in the webs, following which the threaded ends of the bolts will be passed through the registering perforations from the inner side of the joint. The bolts, as will be understood, will extend entirely through said perforations, so as to cause their threaded ends to project beyond the outer face of the outer fish-plate 3. When this is done, the nuts 5 will be applied to the projecting ends of the bolts and turned thereupon until they strike the outer fish-plate. Following this the bolts will be drawn back slightly until the projecting portions of the corrugated surfaces of the nuts enter the channels of the corrugated surface of the fish-plate. After this the head 6 of the bolts will be engaged by wrenches and turned, and as they are turned they are advanced, while the nuts 5 are drawn further inward until they are in the firmest possible solid relation with the outer fish-plate. As the bolts are set, the tapered surfaces 7 thereof will solidly engage the walls of the perforations in the inner fish-plate, so that when the bolts are finally set they, as well as the nuts, are immovably held in position.

I have described in detail the manner of making a joint and have set forth that the bolts are passed through the perforations in the fish-plates and rails from the inner side of the latter. The operation can as well be reversed, as will be gathered from what I have hereinbefore stated. While the nuts and bolts are held immovably, the outer fish-plate by virtue of its engagement with the nut and the inner fish-plate by reason of its engagement with the tapered surfaces of the bolts will be equally firmly held in operative position. In practice the perforations through the webs of the rail will be made of slightly-greater diameter than those in the fish-plates, so as to permit of the contraction and expansion of the rails without affecting the relation of the bolts, nuts, and fish-plates.

The corrugations upon the outer fish-plate, or they may be upon the inner one, as will be understood from what I have hereinbefore stated, are directly formed therein, and they can be rolled in the fish-plate while the latter is being made. The same applies to the corrugations upon the nuts. As the corrugations are directly upon the fish-plates and nuts, I provide a structure that is simple.

When a bolt 5 is set, the tapered surface 7 thereof will be wedged against the wall of a perforation in the coöperating fish-plate, so as to preclude possibility of movement of the bolt. Not only do I hold each bolt firmly in place with a wedge-like action, but I secure the same result by the form of the joint illustrated with respect to the nuts and the coöperating fish-plate. This result I accomplish in the present instance by the corrugations upon the nuts and coöperative fish-plate. The corrugations may be of any suitable character; but they are represented as angular in cross-section. The outer extremities of the projecting portions are shown as blunt or truncated, so that when the projecting portions of a nut are fitted in the channels of the fish-plate they cannot strike the bottoms of said channels, by virtue of which when the nuts are fully set they will be solidly wedged in place. I therefore prevent movement of the bolts, their nuts, and of the fish-plates by the described wedging action at the several places indicated.

Having thus described my invention, what I claim is—

1. The combination of a pair of abutting rails, fish-plates fitted against the rails, the latter and the fish-plates having registering perforations, bolts passing through the perforations and carrying nuts, the inner surfaces of the nuts being corrugated and the outer surface of the adjacent fish-plate being directly corrugated for engagement by the corrugated surfaces of the nuts.

2. The combination of a pair of abutting rails, fish-plates fitted to the rails, the latter and the fish-plates having registering perforations, bolts passing through the perforations and having threaded ends, and nuts fitted onto said threaded ends and to bear against one of the fish-plates, each bolt at the ent thereof opposite that provided with the threaded surface, having a head for engagement by an operating implement and also having an inwardly-tapering surface between said head and the threaded portion, the said tapered surfaces being adapted to fit against the walls of the perforation in the fish-plate opposite that against which said nuts bear and the diameter of each head being less than the greatest diameter of said tapered portion.

3. The combination of a pair of abutting rails, fish-plates fitted to the rails, the latter and the fish-plates having registering perforations, bolts passing through the perforations and having threaded ends, and nuts fitted onto said threaded ends and to bear against one of the fish-plates, each bolt, at the end thereof opposite that provided with the threaded surface, having a head for engagement by an operating implement and also having an inwardly-tapering surface between said head and the threaded portion, the said tapered surfaces being adapted to fit against the walls of the perforation in the fish-plate opposite that against which said nuts bear, said nuts and adjacent fish-plate having engaging roughened surfaces, the diameter of each bolt-head being less than the greatest diameter of the said tapered portion.

4. The combination of a pair of abutting rails, fish-plates fitted to the rails, the latter and the fish-plates having registering perforations, bolts passing through the perforations and having threaded ends, and nuts fitted onto said threaded ends and to bear against one of the fish-plates, each bolt, at the end thereof opposite that provided with the threaded surface, having a head for engagement by an operating implement and also having an inwardly-tapering surface between said head and the threaded portion, the said tapered surfaces being adapted to fit against the walls of the perforations in the fish-plate opposite that against which said nuts bear, said nuts and adjacent fish-plate having engaging corrugated surfaces, the diameter of each bolt-head being less than the greatest diameter of the said tapered portion.

5. The combination of a pair of abutting rails, fish-plates fitted to the rails, the latter and the fish-plates having registering perforations, bolts passing through the perforations and having threaded ends, and nuts fitted to said threaded ends, and bearing against one of the fish-plates, the ends of the bolts opposite the threaded ends having heads shaped for engagement by a wrench and tapered surfaces which taper inwardly from said heads toward the threaded ends, said tapered surfaces being adapted to fit solidly against the perforations in the fish-plate opposite the one against which said nuts bear, the diameter of each bolt-head being less than the greatest diameter of the said tapered portion.

6. The combination of a pair of abutting rails, fish-plates fitted against the rails, the latter and the fish-plates having registering perforations, bolts passing through the perforations and carrying nuts, the inner surfaces of the nuts and the outer surface of the adjacent fish-plate being directly corrugated, and the projecting portions of the corrugated surfaces of the nuts being adapted to enter and to be wedged in the channels of the corrugated surface of the fish-plate.

7. The combination of a pair of abutting rails, fish-plates fitted against the rails, the latter and the fish-plates having registering perforations, bolts passing through the perforations and carrying nuts, the inner surfaces of the nuts and the outer surface of the adjacent fish-plate being corrugated, the corrugations being angular in cross-section and blunt at their outer ends, whereby when the nuts engage the fish-plates the corrugated surfaces thereof will be wedged together.

8. The combination of abutting rails, a fish-plate against the rails and having corrugations extending across the joint between the same, bolts, the fish-plate and rails being perforated to receive the bolts, and nuts upon the bolts, having corrugated surfaces to engage the corrugated surface of the fish-plate.

9. A fish-plate for rails, having its outer surface directly and continuously corrugated.

10. A rail-joint involving a fish-plate and a bolt having a tapered portion, the fish-plate having an opening to receive said tapered portion, and the bolt having a head constructed to be engaged by a wrench to permit the turning of the bolt, the head being of a size to enter said opening.

11. The combination of abutting rails, a fish-plate against the rails, and a bolt, the fish-plate and rails having registering openings to receive the bolt, the latter being tapered to fit in a hole in one of the fish-plates, the other fish-plate being roughened, and a nut on the bolt, also roughened, to engage the other roughened surface, the bolt having a head adjacent the tapered portion thereof to enter the opening that receives such tapered portion.

12. A rail-joint involving a fish-plate, a bolt, and a nut on the bolt, the nut and the fish-plate having coöperative roughened surfaces, the bolt having a tapered portion and the joint having a bearing for the tapered portion, the bolt when turned serving to draw the roughened surface of the nut solidly against the roughened surface of the fish-plate.

13. A rail-joint involving a fish-plate, a bolt, and a nut on the bolt, the bolt having a tapered portion and the joint having a bearing for said tapered portion, the bolt when turned serving to draw its nut toward and into locking relation with the fish-plate.

14. A rail-joint involving a corrugated fish-plate, a bolt extending through the fish-plate, a nut carried by the bolt, the latter having a tapered portion, the joint having a bearing for said tapered portion, the nut being corrugated and the bolt when turned serving to draw the corrugations on the nut solidly into the corrugations of the fish-plate.

15. A rail-joint involving two fish-plates, a bolt extending through the fish-plates and having a tapered portion bearing against one of said fish-plates, and a nut on the bolt to cooperate with the other fish-plate, the bolt when turned serving to draw said nut toward said last-mentioned fish-plate.

16. A rail-joint involving two fish-plates having registering perforations, a bolt extending through the perforations and having a tapered portion to be wedged in the perforation of one of the fish-plates, and a nut carried by the bolt and coöperative with the other fish-plate, the bolt when turned serving to draw the said nut against the coöperating fish-plate.

17. A rail-joint involving two fish-plates having registering perforations, a bolt extending through the perforations and having a tapered portion to be wedged in the perforation of one of the fish-plates, and a nut carried by the bolt and coöperative with the other fish-plate, the latter and the nut having corrugated surfaces, the bolt when turned serving to draw the corrugations of the nut into the corrugations of the fish-plate.

18. A rail-joint involving a bolt and a nut, the bolt having a tapered portion and the joint having an opening in which said tapered portion is wedged when the bolt is turned and the joint having a part with which said nut is drawn into locking relation on such turning motion.

19. A rail-joint involving a bolt and a nut, the bolt having a tapered portion and the joint having an opening in which said tapered portion is wedged when the bolt is turned and the joint having a part with which the nut is drawn into wedge-locking relation on such turning motion.

20. A rail-joint involving a fish-plate and a nut, one of the parts having a groove and the other having a projecting portion to enter said groove, and a bolt carrying the nut, said bolt when turned serving to wedge said projecting portion in said groove.

21. A rail-joint involving a fish-plate and a nut one of the parts having a groove and the other a projecting portion to be wedged in said groove, a bolt carrying the nut and provided with a tapered portion, the joint having an opening to receive said tapered portion, and said tapered portion when the bolt is turned being adapted to be wedged in said opening and at the same time to draw said projecting portion into wedge relation in said groove.

In testimony whereof I have hereunto set my hand in presence of two subscribing witnesses.

HOSEA ALLEN.

Witnesses:

HEATH SUTHERLAND,

BERNARD P. VASHOU.